United States Patent

Schwarz

[11] Patent Number: 5,488,834
[45] Date of Patent: Feb. 6, 1996

[54] CONTROL CIRCUIT FOR A REFRIGERATING SYSTEM

[75] Inventor: Marcos G. Schwarz, Joinville, Brazil

[73] Assignee: Empresa Brasileira de Compressores S/A - Embraco, Joinville, Brazil

[21] Appl. No.: 225,373

[22] Filed: Apr. 8, 1994

[30] Foreign Application Priority Data

Apr. 14, 1993 [BR] Brazil .................................. 9300953

[51] Int. Cl.⁶ ................................................ F25B 49/02
[52] U.S. Cl. ................................ 62/126; 62/229; 62/230; 361/22; 361/24
[58] Field of Search ........................... 62/126, 127, 129, 62/229, 230, 228.1, 208; 361/22, 24, 25, 27, 31

[56] References Cited

U.S. PATENT DOCUMENTS

| | | | |
|---|---|---|---|
| 3,633,073 | 1/1972 | Day, III | 62/230 X |
| 3,742,303 | 6/1973 | Dageford | 361/22 |
| 3,874,187 | 4/1975 | Anderson | 62/230 |
| 4,653,285 | 3/1987 | Pohl | 62/126 |
| 4,709,292 | 11/1987 | Kuriyama et al. | 361/22 |
| 4,968,338 | 11/1990 | Sugiyama | 62/126 |
| 5,209,075 | 5/1993 | Kim | 62/129 X |

*Primary Examiner*—Harry B. Tanner
*Attorney, Agent, or Firm*—Darby & Darby

[57] ABSTRACT

Control circuit for a refrigerating system, used in hermetic compressors, comprising first and second temperature sensors (61,62) and a current sensor (63) for the current drawn by the motor, said control circuit including a central processing unit (30), which instructs at least the selective closing of first and second driving switches (40,50), which are respectively connected with a main winding (11) and with a starting winding (12) of an electric motor (10), when the first temperature sensor (61) detects a temperature inside the refrigerating cabinet corresponding to a maximum value of an ideal temperature interval, previously informed to the central processing unit (30), the temperature of the motor (10) and the current drawn by said motor (10) being within their respective ideal operative values, previously informed to said central processing unit (30).

4 Claims, 2 Drawing Sheets

FIG. 1
PRIOR ART
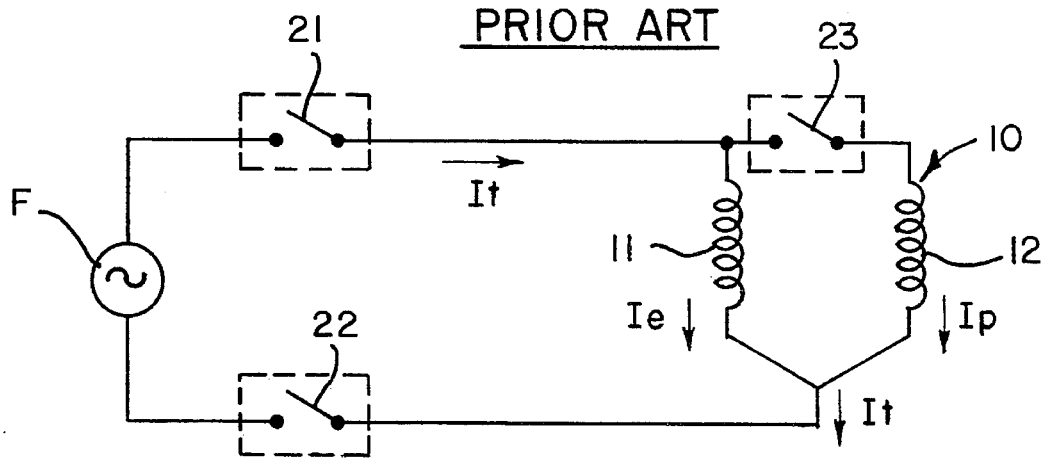
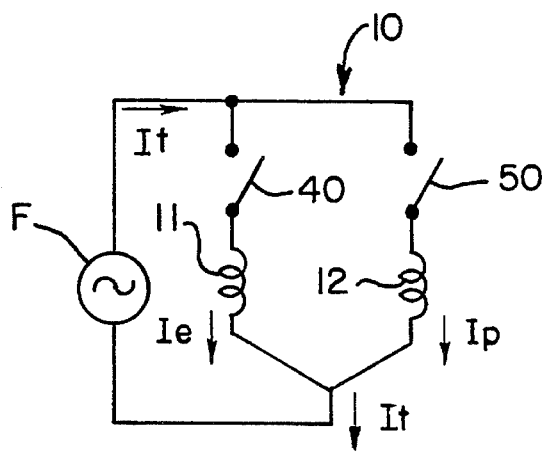
FIG. 3
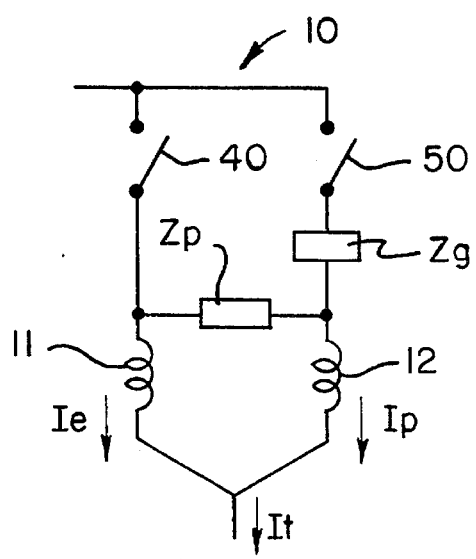
FIG. 4

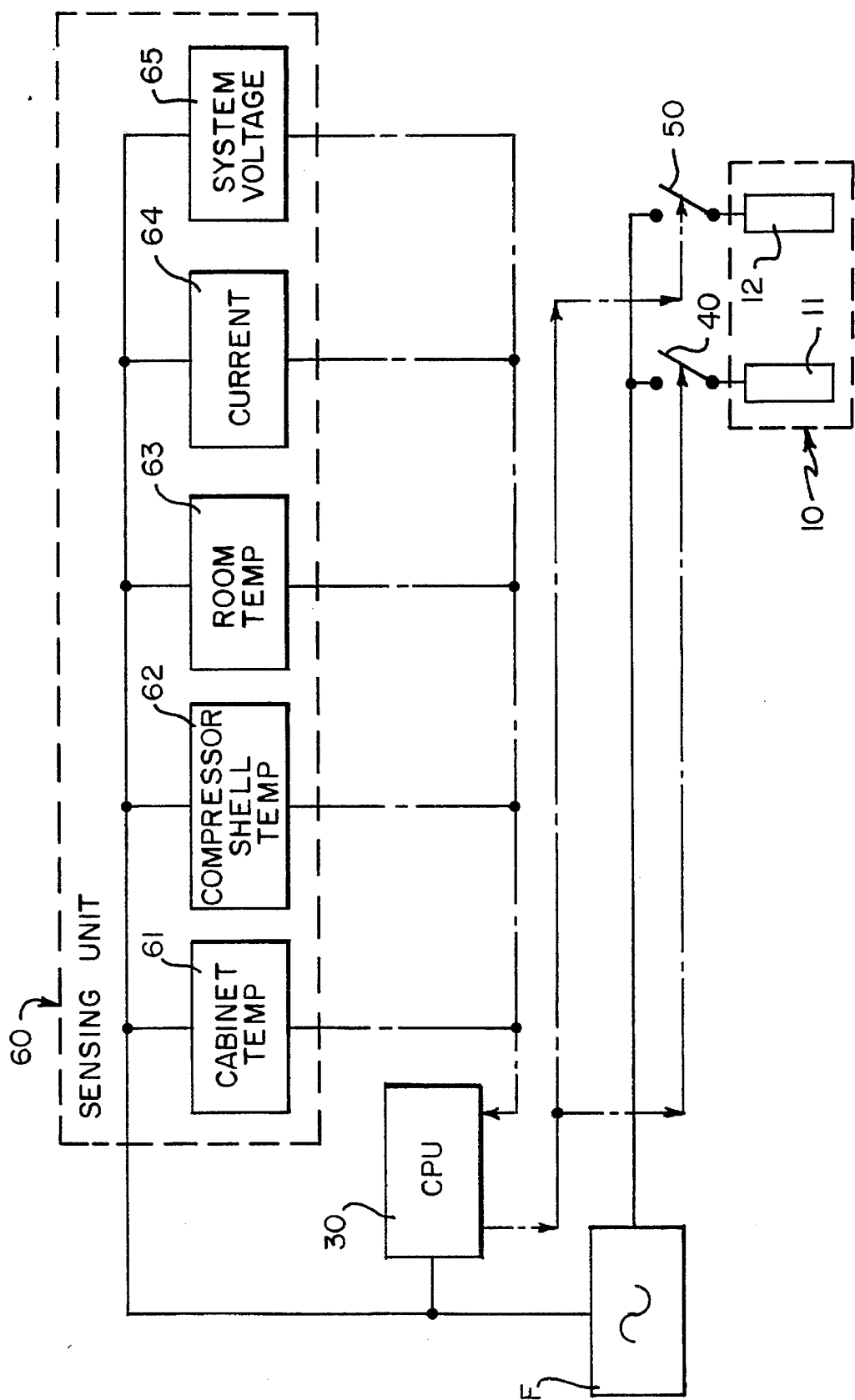

CONTROL CIRCUIT FOR A REFRIGERATING SYSTEM

FIELD OF THE INVENTION

The present invention refers to a control circuit for a refrigerating system, which is particularly used in refrigerators and freezers, and which acts in said refrigerating systems to control the basic operative functions and to protect the motor against damages resulting from undue heating.

BACKGROUND OF THE INVENTION

In the known refrigerating systems, the operation of the hermetic compressor is obtained by driving a single phase induction motor through electromechanical control devices. In these systems, the operative and stop periods of the compressor are defined as a function of a temperature, which is detected by appropriate sensors located inside the refrigerating cabinet of refrigerators and freezers in which said refrigerating system is applied. The compressor stop occurs whenever the temperature inside the cabinet is within a predetermined temperature interval. These systems are also provided with starting and thermal protecting devices for the hermetic compressors, usually consisting of electromechanical devices, due to their strength and simplicity.

A disadvantage in the presently used systems is in the amount of different electrical and electromechanical devices that are employed in the hermetic compressors and that have redundant functions, thereby also requiring individual connections and calibration. Said devices also generate noise and electromagnetic interference, since they are provided with movable contacts.

Another disadvantage in the present systems is the insensibility to the supply voltage variations, which impairs the function of thermal protection, resulting in overloading more severely the insulating material of the motor, and the possible overall malfunctioning of said motor in extreme voltage conditions. Moreover, for carrying out other functions differing from those cited above, the refrigerating systems require the use of additional peripheral devices, which mean a larger number of components and electrical connections, thereby increasing the cost of the assembly and allowing the occurrance of failures in said connections and components.

DISCLOSURE OF THE INVENTION

Thus, it is an object of the present invention to provide a control circuit for refrigerating systems, which allows the start of the motor and protects the motor and other components of the system against damages resulting from overheating during each operative period of the compressor.

A second object of the present invention is to provide a control circuit as described above, which determines the start and the duration of each operative period of the compressor, in order to maintain the temperature thereof and of the inside of the refrigerating cabinet, within respective intervals of predetermined ideal operative values.

A third object of the present invention is to provide a control circuit as described above, which further controls other operative functions of the refrigerating system.

A fourth object of the present invention is to provide a refrigerating system, such as refrigerators and freezers, with an electronic system of the above cited type, which has small size and which does not generate noises and electromagnetic interference.

A fifth object of the present invention is to provide a circuit as cited above, which avoids a defective operation in case of supply voltage variations.

These objectives are attained through a control circuit for refrigerating systems of the type comprising: an electric motor of a hermetic compressor, the motor having a main winding and a secondary starting winding, said circuit including: a first temperature sensor, which is operatively disposed inside a refrigerating cabinet, in order to constantly detect the inner temperature of the latter; a second temperature sensor, operatively disposed adjacently to the compressor shell, in order to constantly detect the temperature of the compressor shell; a current sensor, operatively disposed in series with the electric circuit that feeds the compressor, in order to constantly detect the current that is drawn by the motor. The control circuit also has a first operable electronic driving switch, which selectively communicates a power source with the main winding of the motor, when in a closed operative condition of the compressor operation, and interrupts the said communication when in an open operative condition; a second operable electronic driving switch, which selectively communicates the power source with the starting winding of the motor, when in a closed operative condition of the compressor start, and interrupts the said communication when in an open operative condition, which is automatically obtained after a determined time interval for the closing of the second electronic driving switch. There is also a central processing unit, supplied by the power source and operatively connected to the first and second driving switches, in order to command the operation of said first and second driving switches, as a function of the temperature and current operative conditions detected by the sensors. Said central processing unit instructs the closing of both the first and second driving switches when the temperature inside the refrigerating cabinet, detected by the first temperature sensor, reaches a maximum value of a predetermined temperature interval, and opens the first driving switch when the detected temperature equals the minimum value of said temperature interval. The said central processing unit allowing the closing of both the first and second driving switches when the average temperature of the compressor shell detected by the second temperature sensor is lower than the maximum predetermined operative value, and causes the opening of the first driving switch when the average temperature surpasses said maximum value, even if the temperature inside the cabinet is higher than the maximum desired value. The central processing unit also instructs the opening of at least the first one of the driving switches when the intensity of the average current drawn by the motor, said current being the one drawn by the motor and detected by the current sensor and integrated in a determined time interval by said central processing unit, surpasses a maximum predetermined operative value, even if the temperature of the motor is within its acceptable operative range and the temperature inside the cabinet is higher than the minimum desired value.

DESCRIPTION OF THE DRAWINGS

The invention will be described below, with reference to the attached drawings, in which:

FIG. 1 illustrates schematically an operative electric circuit for a refrigerating system provided with thermal protection, according to the state of the art;

FIG. 2 shows in a block diagram an arrangement for the operation of a refrigerating system, according to the present invention;

FIG. 3 illustrates schematically an operative electric circuit for a refrigerating system provided with thermal protection, according to the present invention; and FIG. 4 shows an embodiment of a motor using external impedances for starting and for operation.

BEST MODE OF CARRYING OUT THE INVENTION

According to the figures described above, an electric motor of a compressor is electrically actuated by a power source F, which supplies to a main winding 11 and to a starting winding 12 of the motor 10 the alternating current required for the operation of said motor 10. Said refrigerating systems include in their circuits, associated to the motor 10 of the compressor, a thermal protecting device, which disconnects the supply voltage from the power source F to the motor 10, whenever it is detected a temperature increase of said motor 10, or a variation in the intensity of the total current "It" in the supply circuit of said motor 10.

The thermal behavior of the compressor is that of a heat source, mainly represented by the coils thereof. In a permanent operative condition, the temperature in the coils is directly proportional to the temperature in the shell. This proportionality permits the knowledge of said shell temperature to be sufficient to be used in the thermal monitoring for protecting the motor 10 of the compressor. Nevertheless, during current transitory values, such as at the starting of the compressor and the overload during the unsuccessful starting and working operations, said direct proportionality ceases to exist, because the heat transfer between the coils of the motor 10 and the compressor shell is much slower than the heat accumulated by said coils. In this situation, the thermal protection of the motor 10 should be achieved by observing the magnitude of the electric current, since the temperature of the coils in this transitory condition varies with the square of the current magnitude.

Since the damages in the motor 10 result from gradual increases of the current and, consequently, from the temperature of the coils of said motor 10, the thermal protecting device is constructed to detect and actuate in the supply circuit of said motor 10, whenever current or temperature variations occur in said motor 10 with a certain magnitude.

According to the known technique, the refrigerating system comprises a circuit including first and second electromechanical driving switches 21, 22 and a motor starting switch 23, that selectively and automatically permit the communication between the power source F and the motor 10 of the compressor. In this circuit, the first electromechanical driving switch 21 is a thermostat, whereas the second electromechanical driving switch 22 is a thermal protecting device. In this construction, the first electromechanical driving switch 21 is operable between a closed operative condition, which allows the current to pass to the motor 10, and an open condition, which opens the current communication with the motor 10, by action of a temperature sensor, which consists of a thermostat mounted inside the refrigerating cabinet, whenever the sensor detects a temperature inside said refrigerating cabinet corresponding to, respectively, a maximum and a minimum temperature value of a temperature range that is previously determined and that is the ideal for the operation of the refrigerator or freezer, to which said systems are applied.

When the temperature inside the cabinet reaches the maximum value of the temperature range, the first driving switch 21 is closed, thereby allowing that a total current "It", equal to the sum of the partial currents of energization "Ie" and of starting "Ip" of the compressor, reaches a main winding 11 and a starting winding 12 of the motor 10. At this time the second driving switch 22 is also closed, allowing the starting winding 12 to be supplied with the starting current Ip, thereby actuating the compressor and maintaining this operation, till the temperature inside the cabinet reaches the minimum value of the above cited temperature range. In this situation, the temperature sensor opens the first driving switch 21, interrupting the voltage supply both to the main winding 11 and starting switch 23 and, consequently, to the motor 10.

During the compressor start, a portion of the total current It arriving at the motor 10 is directed to the region thereof where the starting switch 23 is located, the latter being conducted to a closed operative condition, thus permitting the passage of current to the starting winding 12.

The starting switch 23 is kept closed only during a time interval (e.g., <1 sec), which is enough to allow the start of the compressor operation, and then said switch 23 opens and is kept opened, till the temperature sensor inside the cabinet causes the closing of both the first driving switch 21 and starting switch 23.

The second driving switch 22 is disposed externally to the compressor shell, in order to interrupt the current circulation through the circuit of the motor 10, whenever determined temperature conditions in the compressor shell or in the current occur during the time interval in which at least the first driving switch 21 is closed, i.e., when the compressor is under operation.

According to this construction, the second driving switch 22 is commanded by action of a second temperature sensor, located adjacent to the external portion of the compressor shell, so as to detect the temperature variations in said shell, representing temperature variations in the motor 10, and of a current sensor, which detects the current overload in the supply circuit of the motor 10.

This temperature sensor, which is not illustrated, consists of a bimetallic plate, close to the compressor shell and adjacent to a resistor, through which circulates the compressor current. The passage of excess current through said resistor causes the change in the bimetallic plate shape, causing the opening of the second driving switch 22 and thus interrupting the current in the circuit.

In this construction, the start of the motor 10 occurs when said first and second driving switches 21, 22, as well as the starting switch 23 are closed, said situation lasting for a time, sufficient for the motor to be accelerated (e.g., <1 sec) and to reach its normal running state, when the starting switch 23 opens, remaining in this condition till the first driving switch 21 is closed again, after having been closed for a determined time interval of the compressor operation. If, during the time in which the first driving switch 21 is closed, the temperature of the motor or the current drawn by said motor suffers alterations, the second driving switch 22 opens, interrupting the current passage through the circuit, till the ideal conditions for the operation of the refrigerating system are recovered. Said second driving switch 22 may remain open, even if the first driving switch 21 is closed.

Though this system protects the compressor against damages resulting from heating, the protection is unsatisfactory, besides presenting the above cited inconveniences of redundance of operative elements, noises, etc..

According to the present invention, as illustrated in FIGS. 2–4, the refrigerating system incorporates, between the power source F and the motor 10 of the compressor, first and second electromechanical driving switches 40 and 50, which are preferably of the triac type and which allow the selective electrical communication between said power source F and, respectively, the main winding 11 and starting winding 12 of the motor 10 of the compressor. The said switches 40 and 50 are controlled by a central processing unit (CPU) 30 fed by the power source F and is operationally in communication with said driving switches 40, 50. The control circuit further includes a sensing unit 60, including a plurality of sensors, illustratively shown as 61, 62, 63, 64 and 65, which will be described below and which inform the CPU 30 of the operative condition of the refrigerating system, in order to determine whether the operative state of each of the first and second driving switches 40, 50 is to be altered.

In this construction, the CPU 30 communicates with a first temperature sensor 61, which monitors the internal temperature of a refrigerating cabinet, with which the present refrigerating system is associated, and which informs the said CPU 30 whether the detected temperature is within a value of a range previously established as ideal.

Besides the first temperature sensor 61, the CPU 30 communicates with a second temperature sensor 62, which informs the CPU 30 of the temperature of an external portion of the compressor shell, corresponding to the temperature of the motor 10 of said compressor.

Though the first temperature sensor 61, which monitors the internal temperature of the refrigerating cabinet, is installed at an insulating internal wall portion of the refrigerator, the temperature detected by said first sensor 61 further presents a contribution from the room temperature where said refrigerating cabinet is installed. In order to compensate for the temperature oscillation in the refrigerating cabinet, due to the influence of the room temperature, the system includes a third temperature sensor 63, which is disposed externally to the refrigerating cabinet, in order to monitor the room temperature, where said cabinet is located, informing this value to the CPU 30. The positive variations of the temperatures detected by the third temperature sensor 63 will be used by said CPU 30 for correcting the internal temperature of the cabinet. This corrected value is then analyzed by the CPU 30, in order to determine whether the actuation of the compressor is necessary.

Another sensor connected with the CPU 30 is the current sensor 64, which informs said CPU whether the current drawn by the motor 10 presents any variation relating to the total current of the supply circuit. The variations in the motor temperature and in the current drawn by the motor are analyzed in said CPU 30, considering the information received by said CPU 30 and sent by said second temperature sensor 62 and current sensor 64 integrated in time, since such variations, when instantaneous, are not sufficient to impair the integrity of the compressor, if not repeated in time.

In order to operate, the compressor has to be supplied with a voltage that should be in a range, tipically from 90% to 110%, around the nominal value (100%) to which it was designed. Below the minimum limit of this voltage range, the operation could be achieved in a deficient way. This is due to the fact that the compressor may not be able to support the load to which it was subjected in the starting operation. Above the upper limit of the voltage range indicated for the operation, there will be an increase in the electrical losses and, consequently, in the temperature of the motor 10. Generally speaking, the operation of the motor 10 in an operative voltage above or below the limits of the voltage indicated for the compressor operation, will cause a reduction in the quality of the thermal protection of the motor 10. In order to monitor said voltage variation, the system of the present invention further comprises a voltage sensor 65, which constantly informs the CPU 30 of the operative voltage of the system.

When the voltage variations are detected by the voltage sensor 65, the CPU 30 analyzes said information, in order to compensate for internal parameters, which analyze the information about the current drawn by the motor 10 and about the temperature of the shell, thereby guaranteeing an efficient thermal protection and a safe operation for the compressor. If there are voltage variations above or below the values defined as ideal for the compressor operation, the voltage sensor 65 informs the voltage value detected in the system to the CPU 30, which instructs the opening of the first and second driving switches 40, 50, till the normal voltage condition is detected, so as to avoid the coil heating by transitory values.

When this voltage condition out of the patterns previously informed to the CPU 30 is detected during the time period in which the compressor is deactivated, the CPU 30 will instruct the first and second driving switches 40, 50 to remain open, till the ideal operative condition of the system is reset, even if the first temperature sensor 61 is informing the CPU 30 that the temperature inside the cabinet is at its upper limit.

When the voltage is above the previously determined operative limits for the compressor operation, meaning that the temperature of the compressor shell has increased, the second temperature sensor 62 will be activated, opening said first and second driving switches 40, 50, till a safe operative condition is reset for the compression operation.

Upon evaluating the information received by the sensors 60, the CPU 30 determines which operation is to be performed at the first and second switches 40, 50, according to a detection priority criterium, previously informed to the CPU 30.

According to this criterium in normal voltage conditions, when a temperature inside the refrigerating cabinet is detected to be equal to the maximum in the temperature range that is ideal for the cabinet, the first temperature sensor 61 informs this fact to the CPU 30, which commands the closing of the first and second switches 40, 50, thereby allowing the activation of the compressor through the passage of the energization current Ie across the main winding 11 of the motor 10, and of the starting current Ip, across the secondary starting winding 12 of said motor 10.

As in the case of the starting switch 23 of FIG. 1, after a determined time interval for the closing of the first and second driving switches 40, 50, sufficient for the motor to reach its normal operation state, the second switch 50 is automatically open, interrupting power source F communication to the secondary starting winding 12 and remains in this state until the CPU 30 commands a new closing of said switches 40, 50.

As in the case of the switch 21 of FIG. 1, the first switch 40 will be opened by instructions from CPU 30 when it is informed by the first temperature sensor 61 that the temperature inside the refrigeration cabinet has reached the minimum interval temperature.

Nevertheless, the closing command for said first and second driving switches 40, 50, upon actuation by the first sensor 61 sensing a cabinet temperature above the predetermined range will only occur if the second (compressor shell) temperature sensor 62, together with the information previously received by the current sensor 64, detects an acceptable condition for the compressor operation.

This operation condition means that the average temperature of the compressor shell is below a maximum level permitted and previously established.

If the second (compressor shell) temperature sensor 62 detects a corresponding temperature of the motor 10 higher than the acceptable interval for operation, said first and second driving switches 40, 50 will remain open, independently from any other information received by the CPU 30. If the compressor is in operation and sensor 62 senses an abnormal temperature, CPU 30 commands the opening of the first driving switch 40 interrupting the compressor operation.

In a similar manner, upon a detection by sensor 64 of an average current drawn by the motor or a voltage by sensor 65 not within the ideal pre-established operation range, the first and second driving switches 40, 50 remain open even if an operation of the compressor is required by the temperature conditions of the refrigeration cabinet as sensed by sensor 61 and said compressor operation is permitted by the temperature conditions of the compressor shell as sensed by sensor 62. If it should occur that the current or voltage are not within the respective ideal operation range during the compressor functioning, CPU 30 opens the first driving switch 40 even if the internal refrigeration cabinet temperature is above the minimum level of its ideal temperature interval.

According to the illustration in FIG. 4, the present system may present, among its components, external impedances, one of which being disposed between the point connected with the winding of the main coil 11 and the point connected with the winding of the starting winding 12, while the other impedance is disposed between the second driving switch 50 and the point connected with the winding of said starting coil 12, such as described in the Brazilian Patent Application PI 8906225.

I claim:

1. Control circuit for a refrigerating system of the type comprising:

an electric motor of a hermetic compressor having a main winding and a secondary starting winding;

a first temperature sensor to be disposed inside a refrigerating cabinet to constantly detect the inner temperature of the cabinet;

a second temperature sensor disposed adjacent to the compressor shell to constantly detect the temperature of the compressor shell;

a current sensor in series with the electric circuit that feeds the compressor to detect the current drawn by the motor;

a first operable electronic driving switch, which selectively communicates a power source with the main winding of the motor, when in a closed operative condition of the compressor operation, and interrupting said communication when in an open operative condition;

a second operable electronic driving switch, which selectively communicates the power source with the starting winding of the motor, when in a closed operative condition of the compressor start, and interrupting said communication when in an open operative condition, which is automatically obtained after a determined time interval for the closing of the second operable electronic driving switch;

a central processing unit, supplied by the power source and operatively connected to said first and second driving switches to command the operation of said first and second driving switches as a function of the temperature and current operative conditions detected by the sensors, said central processing unit instructing the closing of both the first and second driving switches when the temperature inside the refrigerating cabinet, detected by the first temperature sensor, reaches a maximum value of a predetermined temperature range, and opening the first driving switch when the detected temperature equals the minimum value of said temperature range; said central processing unit instructing the closing of both the first and second driving switches when the average temperature of the compressor shell detected by the second temperature sensor is lower than the maximum predetermined operative value, and causing the opening of the first driving switch when the average temperature surpasses said maximum value, even if the temperature inside the cabinet is higher than the maximum desired value, said central processing unit instructing the opening of at least the first one of the driving switches when the magnitude of the average current drawn by the motor, said current being the one drawn by the motor and detected by the current sensor and integrated in a determined time interval by said central processing unit, surpasses a maximum predetermined operative value even if the temperature of the motor is within its acceptable operative range and the temperature inside the cabinet is higher than the minimum desired value.

2. Control circuit, according to claim 1, further comprising a third temperature sensor disposed externally to the refrigerating cabinet to inform the central processing unit of the variations for correcting the internal temperature of the refrigerating cabinet, before instructing the closing and opening of the first and second driving switches.

3. Control circuit, according to claim 2, further comprising a voltage sensor operatively connected with the central processing unit to constantly inform the latter of the voltage variations in the electrical network, so that the said central processing unit instructs the correction of the internal parameters of analysis of the information supplied by the second temperature sensor and by the current sensor of the current drawn by the motor.

4. Control circuit according to claim 1 further comprising a voltage sensor operatively connected to said central processing unit to sense the system voltage, said central processing unit operating to open at least one of said first and second driving switches in response to a system overvoltage condition sensed by said voltage sensor.

* * * * *